United States Patent
Pfeifer

(10) Patent No.: US 8,102,598 B2
(45) Date of Patent: Jan. 24, 2012

(54) MICROSCOPE AND PINCHING PREVENTION APPARATUS FOR A MICROSCOPE

(75) Inventor: Gerhard Pfeifer, Wetzlar (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 366 days.

(21) Appl. No.: 12/139,919

(22) Filed: Jun. 16, 2008

(65) Prior Publication Data
US 2008/0310015 A1     Dec. 18, 2008

(30) Foreign Application Priority Data
Jun. 17, 2007   (DE) .......................... 10 2007 028 402

(51) Int. Cl.
*G02B 21/00* (2006.01)
(52) U.S. Cl. ........................................ 359/368; 359/896
(58) Field of Classification Search .......... 359/368–390, 359/656–661, 896
See application file for complete search history.

(56) References Cited

U.S. PATENT DOCUMENTS

| 7,130,116 B2 * | 10/2006 | Tokunaga et al. ............. 359/383 |
| 7,327,514 B2 * | 2/2008 | Uhl et al. ....................... 359/381 |
| 2006/0077537 A1 * | 4/2006 | Nonoda ......................... 359/368 |

FOREIGN PATENT DOCUMENTS
EP            1 643 287 A1    4/2006

* cited by examiner

*Primary Examiner* — Thong Nguyen
(74) *Attorney, Agent, or Firm* — Foley & Lardner LLP

(57) ABSTRACT

The present invention relates to a microscope (1). The microscope (1) comprises a microscope stand (3) and a component (8) arranged movably relative to the microscope stand (3). The microscope stand (3) and the movably arranged component (8) each comprise a surface (11, 10). A gap (9) that can be encroached into from outside is defined by the mutually facing surfaces (11, 10) of the microscope stand (3) and of the movably arranged component (8). The gap (9) changes as a function of the movement of the component (8). The pinching protection apparatus is intended in particular to be of economical configuration and/or to enable a modular microscope concept. The microscope according to the present invention is characterized by a pinching protection apparatus having at least one encroachment protection device (13) that is arranged in the gap (9), is embodied as a thin plate, and extends between the two surfaces in the gap (9).

23 Claims, 7 Drawing Sheets

MICROSCOPE AND PINCHING PREVENTION APPARATUS FOR A MICROSCOPE

CROSS-REFERENCE TO RELATED PATENT APPLICATIONS

The right of foreign priority is claimed under 35 U.S.C. §119(a) based on Federal Republic of Germany Application No. 10 2007 028 402.2, filed Jun. 17, 2007, the entire contents of which, including the specification, drawings, claims and abstract, are incorporated herein by reference.

BACKGROUND OF THE INVENTION

The present invention relates to a microscope. The microscope comprises a microscope stand and a component arranged movably relative to the microscope stand. Such a component can be, for example, an objective turret, a retainer for an objective turret, or a microscope stage. In this context, a component could also be an assembly, for example an objective turret and a carrier for an objective turret. The microscope stand and the movably arranged component each comprise a surface. The mutually facing surfaces of the microscope stand and of the movably arranged component define a gap that can be encroached into from outside. In other words, the gap between the movably arranged component and the microscope stand is defined by the oppositely located or adjacent surfaces of the microscope stand and of the movably arranged component, to the extent that these surfaces are relevant to the region between the component and the microscope stand. In addition, the gap is delimited toward the outside, i.e. where neither a surface of the component or of the microscope stand, nor coverings, panels, or the like, are present, so that a user could reach from outside with his or her hand into the gap. The gap changes as a function of the movement of the component, decreasing or increasing in volume in accordance with the motion performed by the component. When the component moves toward the microscope stand, the volume of the gap decreases. When the component moves away from the microscope stand, the volume of the gap then increases.

In microscopes, focusing of the specimen is accomplished by adjusting the spacing between the specimen and the microscope objective. This can be achieved on the one hand by the fact that the objective's position relative to the microscope stand does not change, but the microscope stage, with the specimen arranged thereon, is moved in the direction of the optical axis. In this case the microscope stage is the movably arranged component for purposes of the present invention. On the other hand, specimen focusing can be accomplished by the fact that the specimen is arranged on a microscope stage that does not modify its position relative to the microscope stand. In this case the objective, and an objective turret that may be provided, is moved relative to the microscope stand. In this case the objective or objective turret or a carrier of an objective turret is the movably arranged component for purposes of the present invention.

These movably arranged components or constituents are located in the immediately accessible vicinity of the microscope's operator. Especially in the context of a specimen manipulation or an objective change using an objective turret, the risk exists that an operator may place his or her hand or a finger into the gap between the microscope stand and the movably arranged component. When the movably arranged component moves toward the microscope stand, i.e. when the spacing between the movably arranged component and microscope stand is decreased, pinching of the operator's hand or finger must be prevented.

SUMMARY OF THE INVENTION

An encroachment guard or pinching protector must therefore always be provided for the user's safety. A bellows or a flexible cover, for example in the form of a rubber or fabric piece with which encroachment into the gap can be prevented, can be provided for this purpose as an encroachment guard or pinching protector between the microscope stand and the movably arranged component. This is, on the one hand, complex in terms of the manner of securing the cover, and therefore associated with a large assembly outlay and considerable manufacturing costs. In addition, the covers require considerable installation space. Additionally or alternatively, fixedly provided covers can be arranged on the microscope stand or on the movably arranged components, which covers extend over the region of the gap that can be encroached into from outside. This can result, however, in limitations with regard to modular configuration of the microscope or of individual components of the microscope. For example, an alternatively embodied objective turret might not be compatible with the microscope stand and the panels arranged immovably thereon.

An object underlying the present invention is therefore that of describing and further developing a microscope and a pinching protection apparatus for a microscope of the kind cited initially, with which encroachment by a user into the gap is economically and reliably prevented, and which requires the smallest possible installation space. It is intended, in particular, to enable a modular microscope concept.

There are various ways of advantageously embodying and refining the teaching of the present invention. In conjunction with the explanation of the preferred exemplifying embodiments of the invention with reference to the drawings, an explanation is also given of generally preferred embodiments and refinements of the teaching.

Further objects, features and advantages of the present invention will become apparent from the detailed description of preferred embodiments that follows, when considered together with the accompanying figures of drawing.

BRIEF DESCRIPTION OF THE DRAWINGS

In the drawings, in schematic fashion in each case:

FIG. 4b is a side view of the encroachment protection device of FIG. 4a;

FIG. 5b is a side view of the encroachment protection device of FIG. 5a;

FIGS. 6a and 7a are perspective views of, respectively, two and four encroachment protection devices embodied comparably to FIG. 5a.

DETAILED DESCRIPTION OF THE PREFERRED EMBODIMENTS

Figure 1:
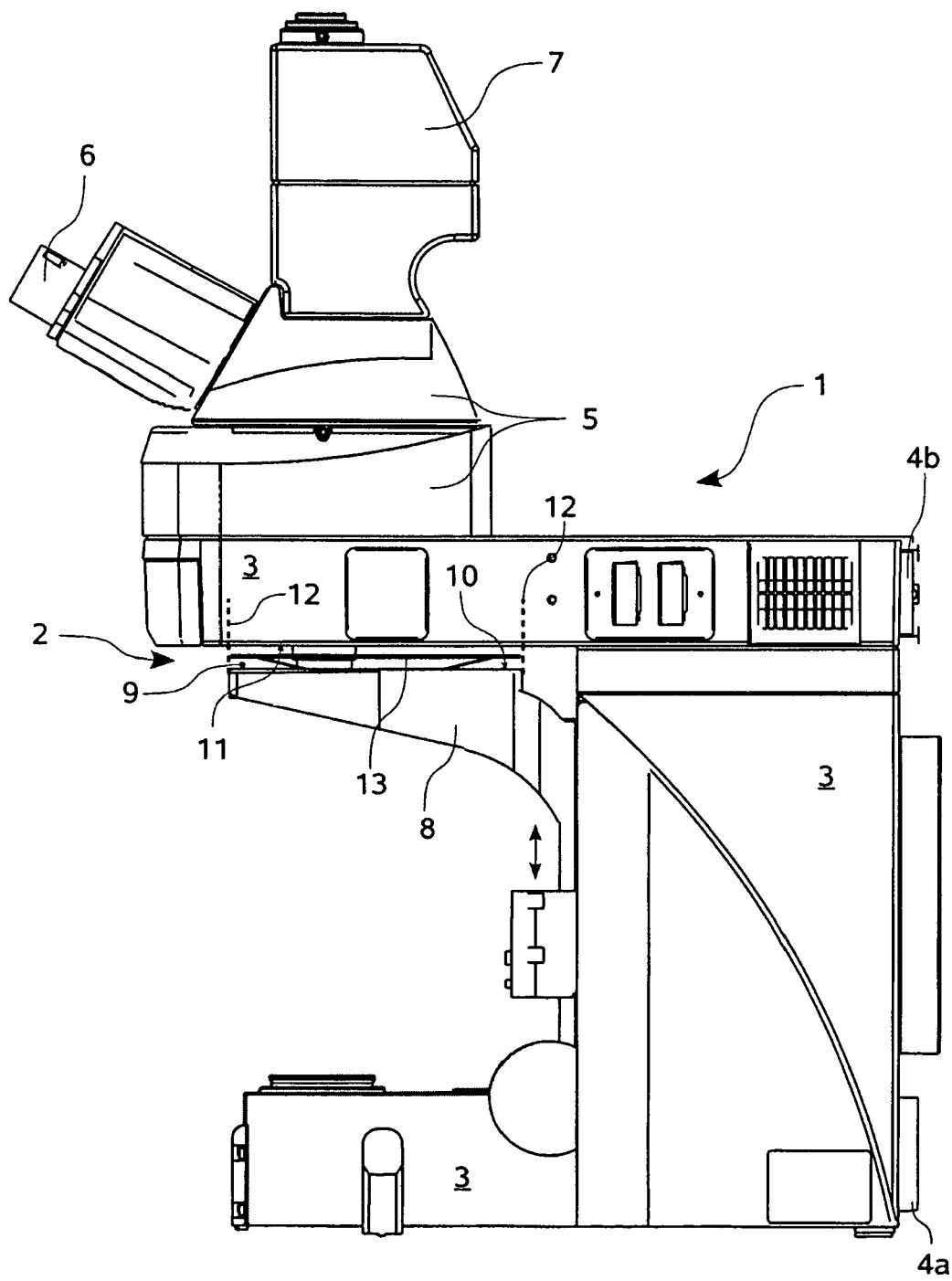
FIG. 1 is a side view of a microscope having a first exemplifying embodiment of a pinching protection apparatus according to the present invention.

A microscope according to embodiments of the invention is characterized by a pinching protection apparatus having at least one encroachment protection device, said device being arranged in the gap, being embodied as a thin plate, and extending between the two surfaces in the gap. The encroachment protection device is usefully dimensioned in such a way that the finger of what may be expected to be an average operator cannot encroach into the gap when the movably arranged component is at a maximum spacing from the microscope stand. A "thin plate" or a thin configuration of the encroachment protection device is to be understood to mean, in particular, that the dimension of the encroachment protection device in a direction perpendicular to the mutually facing surfaces of the microscope stand and/or of the movably arranged component is very small, for example approx. 0.5 to 5 mm. Thicker or thinner embodiments are likewise conceivable, depending on the dimensions of the gap and of the surfaces that constitute it. The encroachment device can therefore be embodied in principle in the form of a flat component and/or one of plate-shaped and/or frame-shaped configuration.

What has been recognized according to the present invention is firstly that it is not necessary to cover the externally accessible region of the gap in its entirety with a bellows or a panel, and thereby prevent encroachment from outside into the gap. It is instead sufficient if the externally accessible region of the gap is protected from encroachment using one or more encroachment protection devices configured as a thin plate. In this context, the encroachment protection device can be arranged in the gap itself and can fill up the installation space that is present there in any case. Advantageously, it is not necessary to arrange on the outer region of the gap any covers that enlarge the external dimensions of the microscope at the location of the gap and/or that require a dependence between the microscope stand and the movably arranged component, e.g. its external dimensions. Advantageously, a pinching protection apparatus can thus be provided in economical and effective fashion with no need to provide, either on the microscope stand or on the movably arranged component, immovably arranged cover panels that entail an additional dependence with regard to dimensioning of the various microscope components of a microscope series.

The encroachment protection device preferably extends at least to the outer periphery of the gap. The outer periphery of the gap is, in particular, the point where no surface of either the component or the microscope stand is present, i.e. where encroachment from outside into the gap might occur, for example by a microscope operator's hand. It is not absolutely necessary that the encroachment protection device be embodied exactly flush, in the immediate vicinity of the gap, with the external dimensions of the microscope stand or of the movably arranged component. The encroachment protection device could also project slightly beyond the external dimensions of the microscope stand or of the movably arranged component, or could also locally not extend, in the gap, entirely to the outer periphery of the gap.

As already indicated, the movably arranged component could comprise a microscope stage or an objective turret or a mount for an objective turret. A pinching protection apparatus of this kind can be used, for example, in microscopes for use in electrophysiology. Microscopes for such applications comprise at least one microscope stage that is arranged immovably, since the biological specimen(s) arranged on the microscope stage are manipulated or investigated using micromanipulators, injectors, and electrodes, and with instruments for measuring current or voltage. In this context, an extremely small motion of the microscope stage would destroy the biological specimen or the living cell being investigated therein. With such an application it is therefore simpler to move the objective, or the objective turret together with the objective, in a direction along the optical axis (Z direction) relative to the microscope stand and to the immovably arranged microscope stage, in order to achieve specimen focusing, while the manipulators, electrodes, etc. are held immovably. There is provided in this context, between the carrier of the objective turret and the part of the microscope stand arranged thereabove, a changeable gap that must be protected, with an encroachment protection device, from encroachment by an operator's hand. To allow a different specimen on the specimen slide or in the Petri dish to be located and investigated, the specimen slide or Petri dish must be arranged movably in a direction transverse to the optical axis. This is usually achieved by way of a microscope stage that can be moved in a horizontal direction in two independent directions (X-Y directions). This, too, is problematic in the specific application in electrophysiology, however, since the micromanipulator(s) or injector(s), and the electrodes, would need to be moved together with the microscope stage in the same fashion. The entire microscope stage can therefore be placed onto a movably arranged displacement stage, and displaced as a whole in two independent directions X, Y transversely to the optical axis, the microscope stage and the micromanipulators or injectors and the electrodes being arranged immovably. Here as well, a gap can be present the microscope stage and microscope stand, which gap changes and likewise constitutes an encroachment hazard. An encroachment protection apparatus could be provided for this gap as well.

At least in the context of the aforementioned examples of a movably arranged component that is embodied in the form of an objective turret or a microscope stage, the component is moved linearly relative to the microscope stand. For example, the objective turret and the microscope objective are moved linearly along the optical axis, i.e. in the Z direction, relative to the microscope stand. If the objective is arranged immovably relative to the microscope stand, a microscope stand is likewise moved linearly in the Z direction relative to the microscope stand when the specimen is focused.

The motion of the movably arranged component relative to the microscope stand could be executable in motorized or manual fashion. In particular, specimen focusing can be achieved by the fact that the objective turret or the microscope stage is moved in motorized fashion, with an electric motor and a transfer mechanism provided for that purpose, relative to the microscope stand. If the microscope is equipped at a lower level, a focusing wheel actuable by the user could be provided, with which wheel the objective turret or microscope stage is moved manually, via a transfer mechanism provided for that purpose, relative to the microscope stand.

According to a preferred embodiment, the encroachment protection device is arranged substantially centeredly between the mutually facing surfaces of the microscope stand and of the movably arranged component. This could relate at least to the operating state in which the movably arranged component is at a maximum spacing from the microscope stand. Preferably, the encroachment protection device could also be arranged in the gap in such a way that regardless of the present relative position between the movably arranged component and the microscope stand, the encroachment protection device is always arranged centeredly between the mutually facing surfaces.

The mutually facing surfaces of the movably arranged component and of the microscope stand could be embodied, at least locally, in substantially planar and/or curved and/or curve-shaped fashion. As a rule, the mutually facing surfaces are of planar configuration over the largest portion. A deviation therefrom is, however, conceivable, specifically when the mutually facing surfaces must exhibit a different or more-complex surface shape for functional reasons. In such a case, the mutually facing surfaces of the movably arranged component and of the microscope stand can be embodied in a manner complementary to one another, in which context individual regions exhibit protrusions (and recesses complementary thereto) or curvatures or curves.

According to a particularly preferred embodiment, the shape or surface shape of the encroachment protection device at least locally corresponds substantially, or is adapted, to the surface shape of the movably arranged component and/or to the shape of the portion of the surface of the microscope stand that is arranged in the gap. In other words, the encroachment protection device is adapted, in terms of its shape, to the surface of the microscope stand or of the movably arranged component, so that despite the encroachment protection device, the movably arranged component can be brought very close to the microscope stand, with the result that a long displacement travel for the movably arranged component can be achieved.

Very particularly preferably, the encroachment protection device is arranged movably relative to the microscope stand and/or to the movably arranged component. For example, the encroachment protection device could be arranged on the microscope stand or on the movably arranged component in such a way that it is arranged centeredly in the gap between the movably arranged component and the microscope stand if their spacing assumes a maximum value. If the movably arranged component is then moved toward the microscope stand, the encroachment protection device could maintain, without change, its spacing with respect to its attachment location as long as the spacing between the movably arranged component and microscope stand has a value greater than half the maximum spacing. As soon as the movably arranged component is moved further toward the microscope stand, the spacing between the encroachment protection device and its attachment location must be able to decrease, i.e. the encroachment protection device must be arranged movably relative to its attachment location.

According to a preferred embodiment, the encroachment protection device is embodied in substantially frame-shaped fashion and/or comprises at least one cutout. A cutout is advisable in particular when the optical beam path extends through the encroachment protection device. A correspondingly shaped cutout is then provided at such a point on the encroachment protection device. The encroachment protection device could also, leaving aside any attachment elements of the encroachment protection device, simply exhibit a frame shape which is embodied in such a way that the encroachment protection device extends on the externally encroachable region of the gap. In this case a cutout is provided in the inner region of the encroachment protection device.

To ensure that a large spacing between the microscope stand and the movably arranged component can be equipped with a pinching protection apparatus, according to a preferred embodiment multiple encroachment protection devices arranged parallel to one another are provided in the gap. If the encroachment protection devices exhibit not a planar but instead, for example, a curved shape, the encroachment protection devices could be spaced equidistantly from one another at least in an operating state. The spacing of the encroachment protection devices from one another could be variable.

For attachment of the encroachment protection device on the microscope stand and/or on the movably arranged component, preferably at least one connecting element is provided. With the latter, the encroachment protection device is immobilized in the gap, in which it is introduced between the surfaces and attached by means of the connecting element to at least one of the surfaces of the microscope stand or of the movably arranged component.

The encroachment protection device and the at least one connecting element could be embodied as separate components that are connected to one another. The encroachment protection device and the at least one connecting element could, for example, be connected to one another by a mechanical connection, for example by means of screw, rivets, or an insertion connection. A connection between the encroachment protection device and the at least one connecting element could also be implemented by soldering, welding, or adhesive bonding. The encroachment protection device and the at least one connecting element could comprise different materials, for example plastic and metal.

The at least one connecting element is preferably flexibly embodied in such a way that the encroachment protection device can execute a reversible relative motion between the movably arranged component and/or the microscope stand. This is necessary especially if the movably arranged component is to be moved almost all the way toward the microscope stand, and as a result has approached almost all the way toward the microscope stand. If the movably arranged component is moved away from the microscope stand again, the encroachment protection device should once again be arranged in a central region in the gap. It comprises a flexible connecting element for this purpose, so that it can thereby change its position relative to the movably arranged component and/or to the microscope stand, or in the gap.

According to a preferred embodiment, the encroachment protection device and the at least one connecting element are embodied as one integral component. An encroachment protection device embodied in this fashion can be manufactured economically with a stamping tool if said device is configured, for example, in the shape of a sheet-metal spring. The at least one connecting element could comprise a dimensionally stable and flexible material. Alternatively or additionally, a connecting element could comprise at least one protruding resilient element.

Concretely, the connecting element is embodied as a sheet-metal spring protruding or projecting from the surface of the plate-shaped encroachment protection device. A sheet-metal spring of this kind is preferably embodied integrally with the encroachment protection device, specifically when the encroachment protection device as such is embodied in the form of a metal sheet. In this case a strip-shaped sheet-metal piece that is bent out of the sheet plane of the encroachment protection device could be provided for each connecting element. Assuming a correspondingly suitable thickness and elasticity property for the sheet-metal piece, it is thereby easy to implement a sheet-metal spring with which the encroachment protection device can be attached to the microscope stand and/or to the movably embodied component, and is nevertheless movable relative thereto.

Particularly preferably, at least two connecting elements are provided, which protrude from opposite surfaces of the encroachment protection device. For example, from the surface of the encroachment protection device one connecting element could protrude in the direction of the microscope stand, and another connecting element in the direction of the movably arranged component. With these two connecting elements, the encroachment protection device can be positioned centeredly between the microscope stand and movably arranged component, or centeredly in the gap. By preference, two, three, or four connecting elements project from the surface of the encroachment protection device, respectively toward the microscope stand on the one hand and toward the movably arranged component on the other hand.

If multiple encroachment protection devices are provided in the gap, a first encroachment protection device could be connected, via its at least one connecting element, to a respective connecting element of a further (adjacent) encroachment protection device or to that further encroachment protection device itself. If the connecting elements possess resilient properties, the encroachment protection devices could thus move, and change their spacing, with respect to one another.

In principle, the encroachment protection device can be produced from any dimensionally stable material. This can be, for example, plastic, foamed polymer, glass fiber reinforced (GFR) plastic, metal, or a natural material (appropriately processed as applicable). According to a very particularly preferred embodiment, the encroachment protection device comprises a metal sheet. A metal sheet of this kind could have a thickness from less than 1 mm to several mm. A maximum spacing between the adjacent surfaces of the microscope stand and of the movably arranged component of, for example, 15 mm can thus be reduced to a minimum spacing between the microscope stand and movably arranged component that corresponds exactly to the thickness of the encroachment protection device. This corresponds, for example, to a minimum achievable spacing of 0.5 mm if a plate 0.5 mm in thickness is used.

The microscope preferably has a modularized design, at least in terms of the movably arranged component and individual components of the microscope stand. For example, it is conceivable that differently configured carriers for objective turrets can be adapted onto the microscope stand, in which context a specially configured encroachment protection device can be provided for the respective module option.

In accordance with some embodiments of the invention, a pinching protection apparatus according to the present invention for a microscope is characterized by at least one encroachment protection device, configured as a thin plate, that is arrangeable in the gap and is embodied in such a way that it extends between the two surfaces in the gap.

Figure 2:
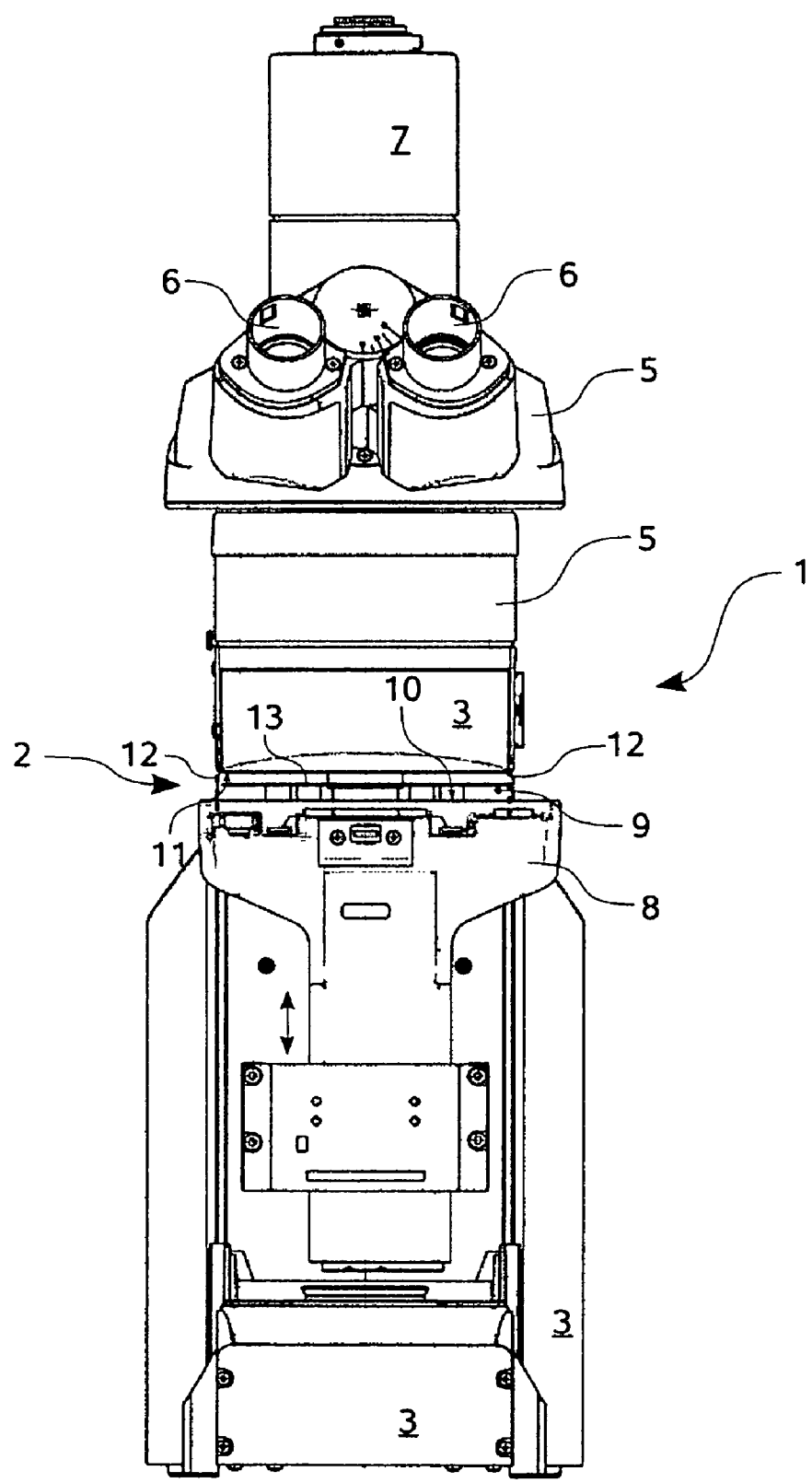
FIG. 2 is a front view of the microscope of FIG. 1.

Identical or similar components are labeled with the same reference characters in the Figures. FIGS. 1 and 2 show a microscope 1 having a pinching protection apparatus 2 according to the present invention. Microscope 1 comprises a microscope stand 3 in which optical components of microscope 1 are arranged. For example, a lamp housing (not shown in FIGS. 1 and 2) having a light source for transmitted illumination can be adapted onto lower interface 4a. A lamp housing having a light source for incident or fluorescent illumination can be adapted onto upper interface 4b. Adapted onto microscope stand 3 is tube housing 5, on which eyepieces 6 on the one hand, and a camera housing 7 on the other hand, are arranged. The microscope stage is not shown in the case of microscope 1 of FIGS. 1 and 2, since said stage is mounted immovably on a workstation (likewise not shown in FIGS. 1 and 2) for microscope 1 for an electrophysiology application.

Carrier 8 for the objective turret (not shown in FIGS. 1 and 2) is arranged movably relative to microscope stand 3, and can be moved in motorized fashion, with an electric motor (not shown) arranged in microscope stand 3, along the optical axis, i.e. in a vertical direction (see double arrow). To that extent, carrier 8 is the component arranged movably on microscope stand 3. For the sake of simplicity, the movably arranged component is likewise labeled with the reference character 8. A gap 9 is located between movably arranged component 8 and the portion located thereabove of microscope stand 3. Gap 9 is delimited on one side by upper surface 10 of carrier 8. On the other side, gap 9 is delimited by lower surface 11 of microscope stand 3, specifically via a region that is indicated with dashed lines 12. Within this region, the two surfaces 10, 11 face one another. Within this region, except for a region through which the optical beam path extends, the two surfaces 10, 11 are embodied in substantially planar fashion and parallel to one another. In a direction transverse to the vertical, gap 9 is delimited by dashed lines 12. From there, an operator could encroach with his or her hand or finger into gap 9 if said gap 9 comprised no encroachment protection device 13.

According to the present invention, an encroachment protection device 13 is provided in gap 9. Encroachment protection device 13 is embodied in the form of a thin metal sheet. Encroachment protection device 13 extends to the outer periphery of gap 9 (indicated by lines 12 in FIGS. 1 and 2). Encroachment protection device 13 accordingly extends to the periphery of the gap along the front side (in FIG. 1, the region to the left of microscope 1, from which an operator usually operates microscope 1), along both sides of microscope 1 (indicated with lines 12 in FIG. 2) and along the region (to the right in FIG. 2) that faces away from the front side and faces toward microscope stand 3. Encroachment from outside into gap 9 by an operator's hand can thus be effectively prevented by encroachment protection device 13.

Encroachment protection device 13 is arranged substantially centeredly between the two surfaces 10, 11 if carrier 8 is at the greatest possible spacing from microscope stand 3. This operating state is shown in FIGS. 1 and 2, and the spacing of the two surfaces 10, 11 is 15 mm.

Figure 3:
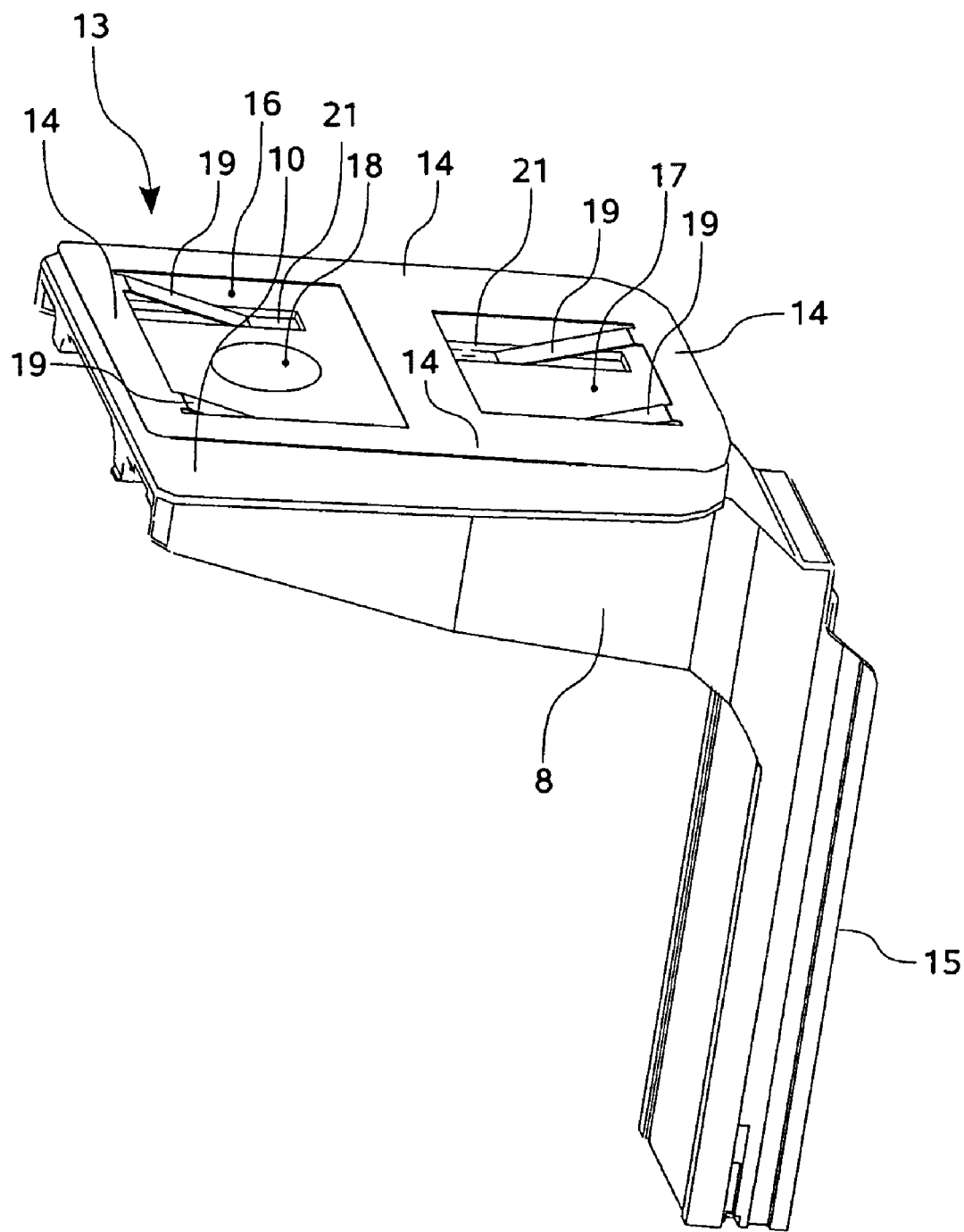
FIG. 3 is a perspective view of the carrier of an objective turret of the microscope shown in FIGS. 1 and 2, having a first exemplifying embodiment of an encroachment protection device attached thereto.

FIG. 3 shows carrier 8 (of FIGS. 1 and 2) of an objective turret (not shown in the Figures) on which encroachment protection device 13 is attached. It is evident in this view that encroachment protection device 13 is embodied in substantially frame-shaped fashion, the outer frame parts 14 being almost entirely coincident with the outer region of surface 10 of carrier 8. With rear side 15 of carrier 8, carrier 8 is movably mountable on microscope stand 3 of FIGS. 1 and 2.

Figure 4A:
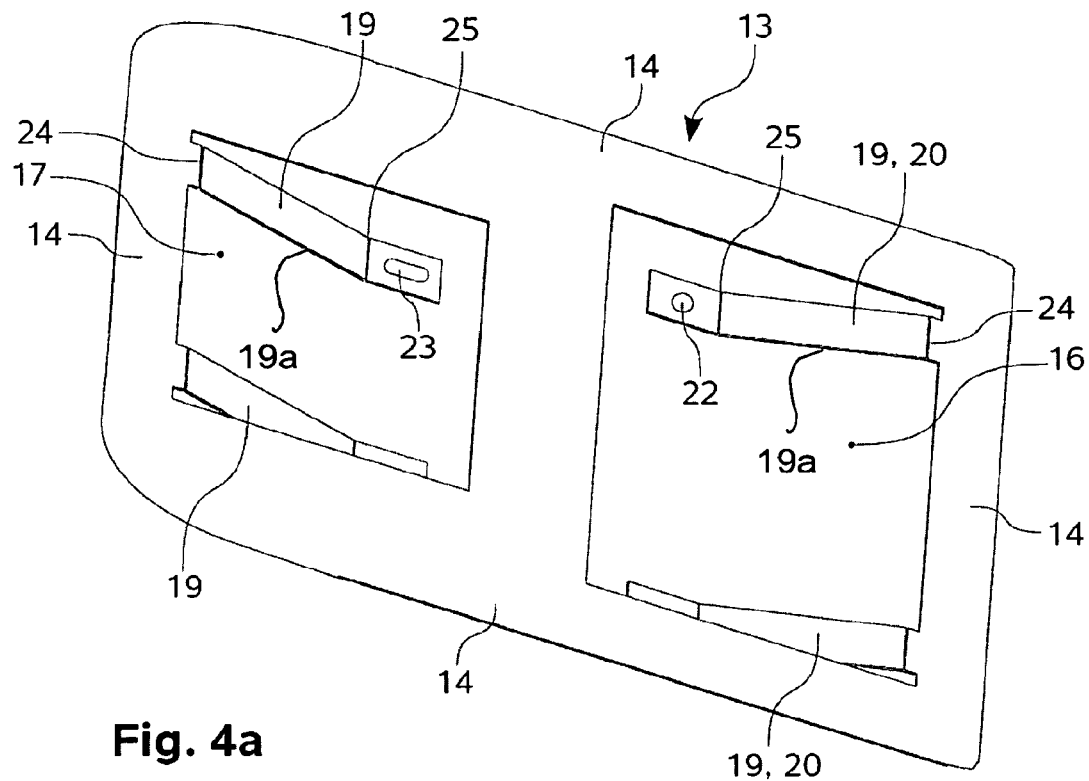
FIG. 4a is a perspective view of the encroachment protection device of FIG. 3.

FIG. 4a shows encroachment protection device 13 of FIG. 3 in a perspective depiction. Encroachment protection device 13 comprises two cutouts 16, 17. The optical beam path extends through cutout 16, this being evident in FIG. 3 from cutout 18 in carrier 8. Encroachment protection device 13 encompasses four connecting elements 19. Encroachment protection device 13 is attached to carrier 8 with the two connecting elements 20 of the four connecting elements 19, specifically into depressions 21 in surface 10 of carrier 8. The two connecting elements 20 comprise circular holes 22 through which screws (not shown in the Figure) extend into orifices, provided therefor, in carrier 8. Encroachment protection device 13 is correspondingly immobilized on connecting elements 20, which are immobilized on carrier 8 with their ends having holes 22. The other two connecting elements 19 comprise elongated holes 23 at their respective ends. Screws (not shown) likewise extend through elongated holes 23; said screws are threaded into orifices (not shown) of carrier 8 but do not immobilize connecting elements 19 in carrier 8. A relative movement between carrier 8 and connecting elements 19 along elongated holes 23 is thus possible. This arrangement of connecting elements 19, 20 in depressions 21 of carrier 8 makes it possible for frame parts 14, and encroachment protection device 13, to move relative to carrier 8. In particular, encroachment protection device 13 can approach surface 10 of carrier 8, specifically if carrier 8 or movably arranged component 8 is in an upper position and can come to a stop against surface 11 of microscope stand 3. In this context, connecting elements 19 and 20 can pivot into depressions 21.

Figure 4B:
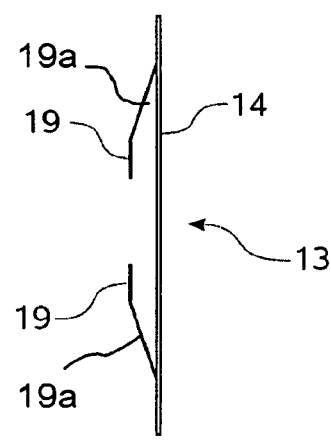

Connecting elements 19 are embodied integrally with encroachment protection device 13, specifically in the form of a correspondingly bent sheet-metal spring that therefore protrudes or projects from the surface of encroachment protection device 13. A connecting element 19 of this kind comprises a first bending point 24 that is arranged on frame part 14 of encroachment protection device 13. A second bending point 25 is provided at a spacing from first bending point 24. Between the two bending points 24, 25, connecting element 19 proceeds in substantially planar and strip-shaped fashion, where the connecting element has a protruding resilient element 19a. The region of connecting element 19 comprising hole 22 or elongated hole 23 is bent in such a way that the surface is parallel to the surface of frame parts 14 of encroachment protection device 13. Because connecting elements 19 are arranged in depressions 21, as shown in FIG. 3, encroachment protection device 13 can be conveyed completely against surface 10 of carrier 8. As soon as sufficient clearance is present, encroachment protection device 13 can once again move into the position shown in FIGS. 1 and 2, since because of depressions 21, connecting elements 19 are not pressed into the same plane if carrier 8 should come directly into contact against encroachment protection device 13, and encroachment protection device 13 directly against microscope stand 3. A reversible relative motion between encroachment protection device 13 and carrier 8 is thus enabled. FIG. 4b is a side view showing encroachment protection device 13 of FIG. 4a. Frame part 14, and connecting elements 19 protruding to the left therefrom, are correspondingly evident.

Figure 5A:
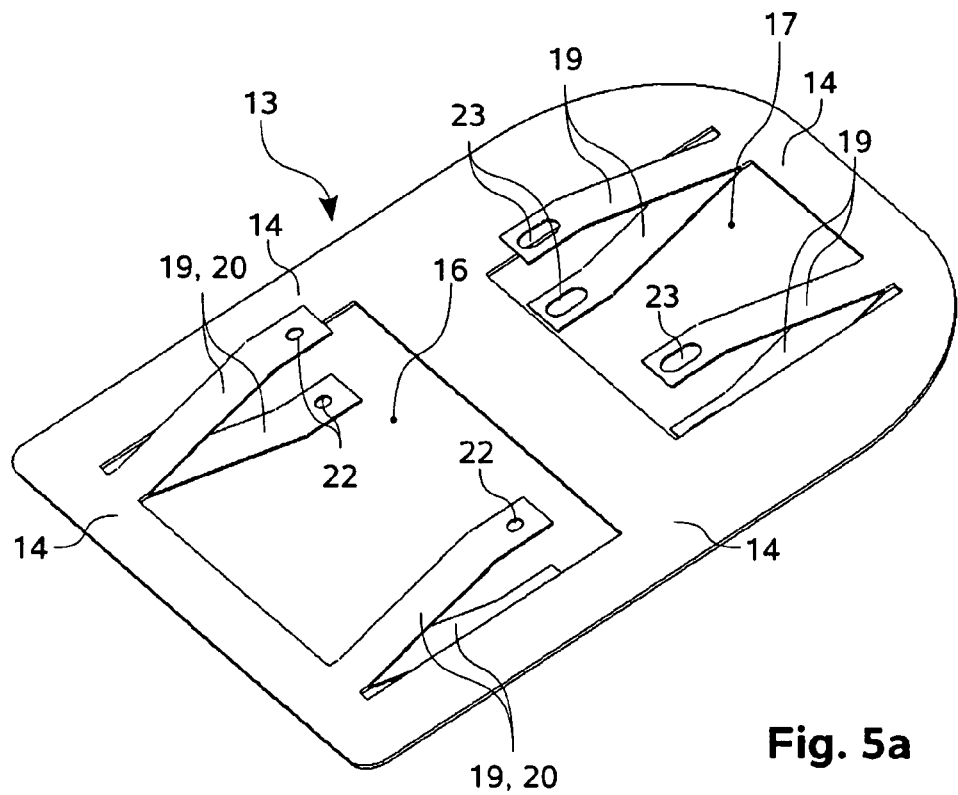
FIG. 5a is a perspective view of a second exemplifying embodiment of an encroachment protection device.
Figure 5B:
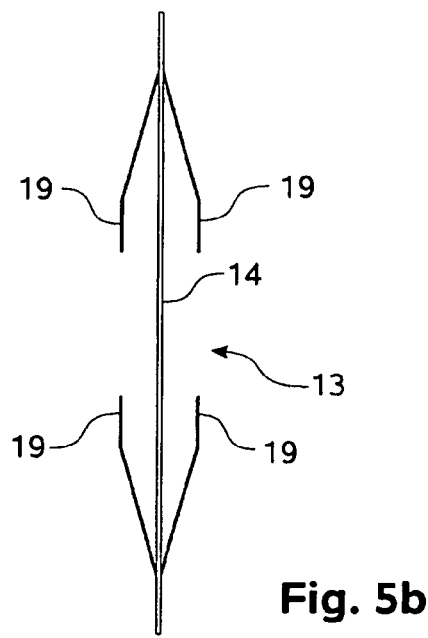

FIG. 5a shows an encroachment protection device 13 that is embodied substantially comparably to the one of FIG. 4a. Where only one connecting element 19 is respectively arranged in the case of encroachment protection device 13 of FIG. 4a, however, two respective connecting elements 19 are provided in the case of encroachment protection device 13 of FIG. 5a. These project in respectively opposite directions with reference to the surface of encroachment protection device 13. This is apparent from the side view in FIG. 5b. Encroachment protection device 13 can in this context, for example, be attached to or brought into contact on the one hand with carrier 8 using the four lower connecting elements 19, and on the other hand with microscope stand 3 using the four upper connecting elements 19. An encroachment protection device 13 arranged in this fashion in gap 9 will also, during a relative motion between movably arranged component 8 and microscope stand 3, always be positioned substantially centeredly in gap 9 between the two surfaces 10, 11.

Figure 6A:
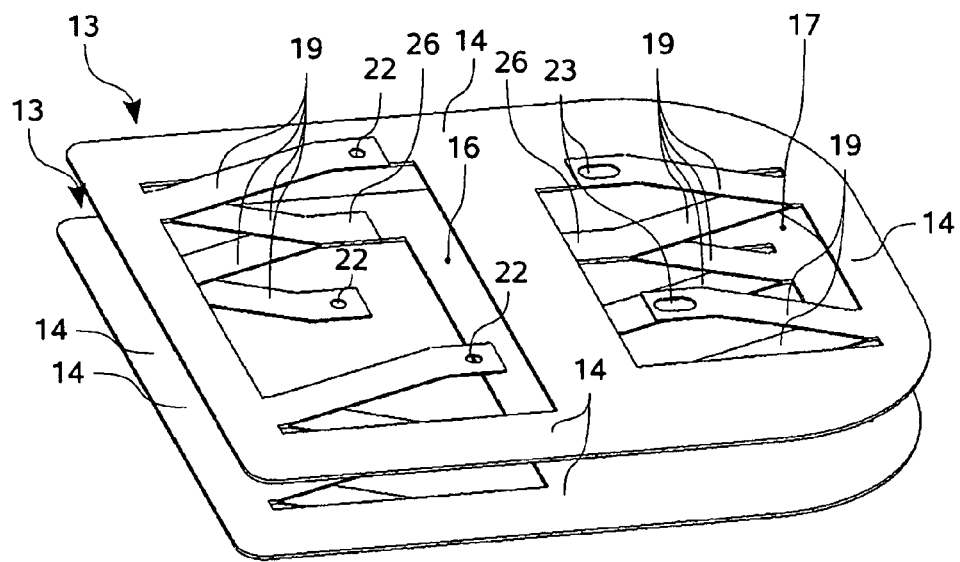

FIG. 6a shows two encroachment protection devices of FIG. 5a that are respectively attached to one another by two mutually facing connecting elements 19. These attachment points are labeled with the reference character 26. The provision of two encroachment protection devices 13 allows a larger gap 9, or a larger maximum spacing between microscope stand 3 and movably arranged component 8 or between the oppositely located surfaces 10, 11, to be protected from encroachment. The manner of operation of the two encroachment protection devices 13 of FIG. 6a is otherwise comparable to that of encroachment protection device 13 shown in FIG. 5a, and the reader is therefore referred to the preceding portion of the description.

Figure 6B:
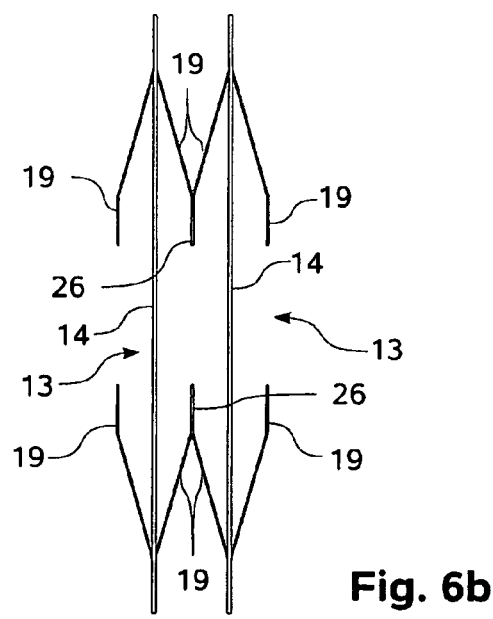
FIGS. 6b and 7b are side views of the encroachment protection devices of FIGS. 6a and 7a, respectively.
Figure 7A:
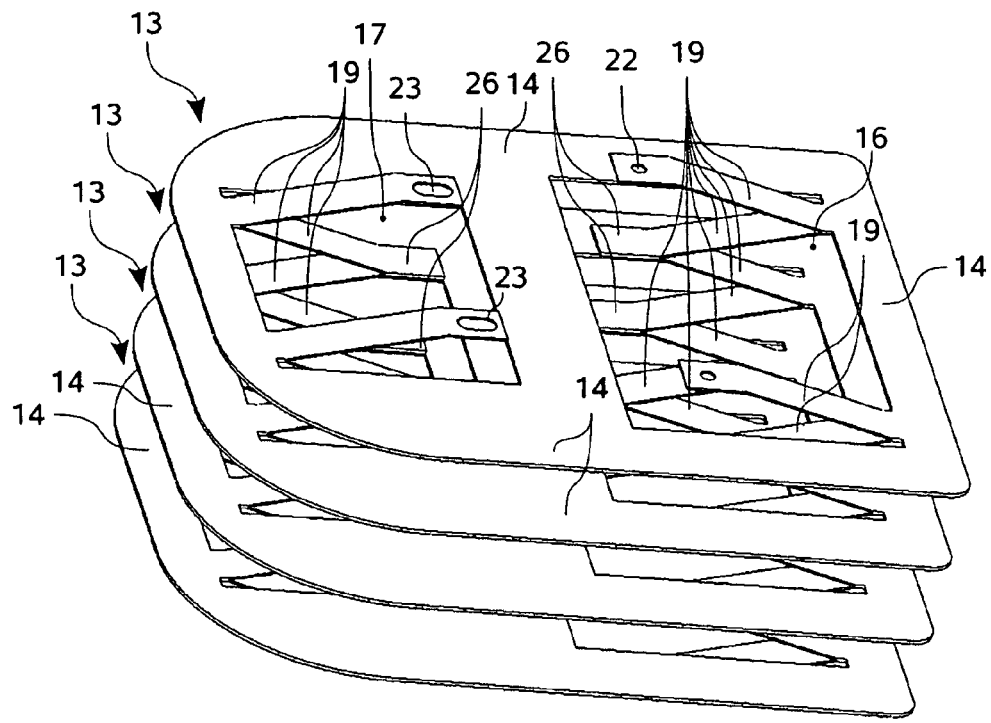
Figure 7B:
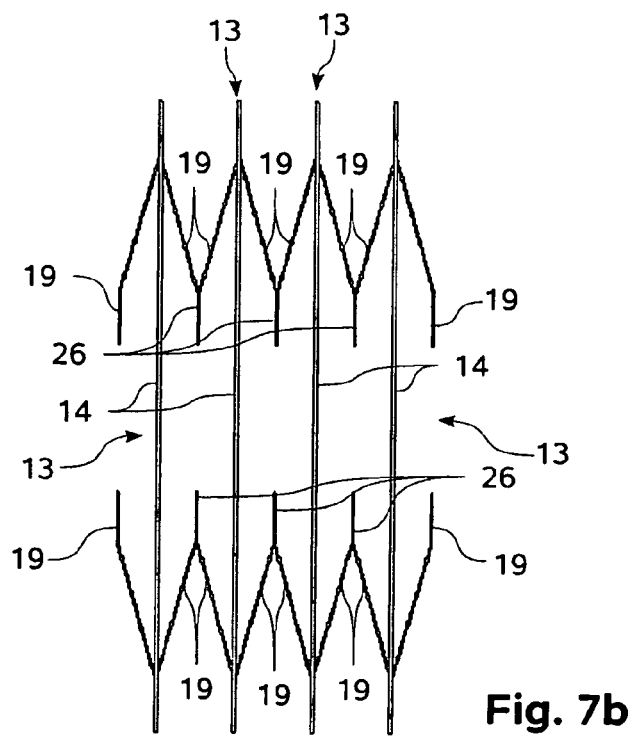

With the four encroachment protection devices 13 shown in FIG. 7a, an even larger gap 9 between microscope stand 3 and movably arranged component 8 can be protected from encroachment by the user than is the case with the two encroachment protection devices 13 of FIG. 6a. The configuration and manner of operation of the four encroachment protection devices 13 of FIGS. 7a, 7b is comparable to the manner of operation of the two encroachment protection devices 13 of FIGS. 6a, 6b, and the reader is therefore referred to the preceding portion of the description in order to avoid repetition.

In conclusion, be it noted very particularly that the exemplifying embodiments discussed above serve merely to describe the teaching claimed, but do not limit it to the exemplifying embodiments.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined with reference to the claims appended hereto and that the claims encompass all embodiments of the invention, including the disclosed embodiments and their equivalents.

PARTS LIST

1 Microscope
2 Pinching protection apparatus
3 Microscope stand
4a, 4b Interface
5 Tube housing
6 Eyepiece
7 Camera housing
8 Carrier for an objective turret, movably arranged component
9 Gap
10 Surface of (8), located opposite (11) of (3)
11 Surface of (3), located opposite (10) of (8)
12 Lines
13 Encroachment protection device
14 Frame parts of (13)
15 Rear side of (8)
16 Cutout of (13)
17 Cutout of (13)
18 Cutout for optical beam path in (8)
19 Connecting elements of (13)
20 Connecting element of (13) with which (13) is immobilized on (8)
21 Depressions in (10) of (8)
22 Hole in (20)
23 Elongated hole in (19)
24 First bending point of (19)
25 Second bending point of (19)
26 Attachment point between two connecting elements of two encroachment protection devices

What is claimed is:

1. A microscope, comprising:
   a microscope stand;
   a component arranged movably relative to the microscope stand, the microscope stand and the movably arranged component each comprising a surface, a gap that can be encroached into from outside being defined by the mutually facing surfaces of the microscope stand and of the movably arranged component, the gap changing as a function of the movement of the component; and
   a pinching protection apparatus having at least one encroachment protection device that is arranged in the gap, is embodied as a thin plate, and extends between the two surfaces in the gap,
   the at least one encroachment protection device comprising at least one flexible connecting element having one end fixed to the thin plate and another end extending to one of the two surfaces,
   the at least one flexible connecting element providing movement of the thin plate to change a distance of the thin plate relative to the one of the two surfaces as the gap changes.

2. The microscope according to claim 1, wherein the encroachment protection device extends at least to the outer periphery of the gap.

3. The microscope according to claim 1, wherein the movably arranged component comprises a microscope stage or an objective turret or a mount for an objective turret.

4. The microscope according to claim 1, wherein the component is movable relative to the microscope stand, linearly motorized or manual fashion.

5. The microscope according to claim 1, wherein the encroachment protection device is arranged centeredly between the mutually facing surfaces of the microscope stand and of the movably arranged component.

6. The microscope according to claim 1, wherein the mutually facing surfaces of the movably arranged component and of the microscope stand are embodied, at least locally, in at least one of planar, or curve-shaped fashion.

7. The microscope according to claim 6, wherein the surface shape of the encroachment protection device at least locally corresponds to at least one of the surface shape of the movably arranged component or the surface shape of a part of the microscope stand.

8. The microscope according to claim 1, wherein the encroachment protection device is arranged movably relative to the microscope stand and/or to the movably arranged component.

9. The microscope according to claim 1, wherein the encroachment protection device is embodied in frame-shaped fashion and/or comprises at least one cutout.

10. The microscope according to claim 1, wherein multiple encroachment protection devices arranged parallel to one another are provided in the gap.

11. The microscope according to claim 1, wherein the encroachment protection device and the at least one connecting element are embodied as separate components that are connected to one another.

12. The microscope according to claim 11, wherein the encroachment protection device and the at least one connecting element are connected to one another by a mechanical connection or by soldering, welding, or adhesive bonding.

13. The microscope according to claim 1, wherein the encroachment protection device and the at least one connecting element comprise different materials.

14. The microscope according to claim 1, wherein the at least one connecting element is flexibly embodied in such a way that the encroachment protection device can execute a reversible relative motion between the movably arranged component and the microscope stand.

15. The microscope according to claim 1, wherein the encroachment protection device and the at least one connecting element are embodied as an integral component.

16. The microscope according to claim 1, wherein at least two connecting elements are provided, which protrude from opposite surfaces of the encroachment protection device.

17. The microscope according to claim 1, wherein a first encroachment protection device is connected, via its at least one connecting element, to a respective connecting element of a further encroachment protection device or to that further encroachment protection device.

18. The microscope according to claim 1, wherein the encroachment protection device comprises a metal sheet.

19. The microscope according to claim 1, wherein the microscope has a modularized design.

20. The microscope according to claim 1, wherein the encroachment protection device comprises a frame spaced between the two surfaces in the gap.

21. The microscope according to claim 1, wherein the at least one flexible connecting element comprises a first flexible connecting element and a second flexible connecting element, the first flexible connecting element having one end fixed to one of the sides of the thin plate and another end extending to one of the two surfaces, the second flexible connecting element having one end fixed to another of the sides of the thin plate and another end extending to another of the two surfaces.

22. The microscope according to claim 1, wherein the at least one encroachment protection device comprises a plurality of encroachment protection devices each having a respective thin plate and at least one flexible connecting element, the plurality of encroachment protection devices stacked within the gap.

23. A pinching protection apparatus for a microscope comprising a microscope stand, and a component arranged movably relative to the microscope stand, the microscope stand and the movably arranged component each comprising a surface, a gap that can be encroached into from outside being defined by the mutually facing surfaces of the microscope stand and of the movably arranged component, the gap changing as a function of the movement of the component, the pinching protection apparatus comprising:
   at least one encroachment protection device, configured as a thin plate, that is arrangeable in the gap and is embodied in such a way that it extends between the two surfaces in the gap,
   the at least one encroachment protection device comprising at least one flexible connecting element having one end fixed to the thin plate and another end extending to one of the two surfaces,
   the at least one flexible connecting element providing movement of the thin plate to change a distance of the thin plate relative to the one of the two surfaces as the gap changes.

* * * * *